United States Patent
Takeuchi et al.

(10) Patent No.: US 7,012,910 B2
(45) Date of Patent: Mar. 14, 2006

(54) WIRELESS PACKET COMMUNICATION SYSTEM AND BASE STATION

(75) Inventors: Yoshio Takeuchi, Saitama (JP); Akira Yamaguchi, Saitama (JP)

(73) Assignee: KDDI Corporation, Tokyo (JP)

( * ) Notice: Subject to any disclaimer, the term of this patent is extended or adjusted under 35 U.S.C. 154(b) by 862 days.

(21) Appl. No.: 09/988,732

(22) Filed: Nov. 20, 2001

(65) Prior Publication Data

US 2002/0105937 A1   Aug. 8, 2002

(30) Foreign Application Priority Data

Dec. 4, 2000 (JP) ............................. 2000-368610

(51) Int. Cl.
H04B 7/212 (2006.01)
(52) U.S. Cl. ..................................... 370/335; 370/348
(58) Field of Classification Search ................ 370/328, 370/329, 335, 336, 342, 345, 347, 348
See application file for complete search history.

(56) References Cited

U.S. PATENT DOCUMENTS 6,393,012 B1 * 5/2002 Pankaj ....................... 370/342
6,590,890 B1 * 7/2003 Stolyar et al. .............. 370/349
6,847,629 B1 * 1/2005 Razoumov et al. ......... 370/349

OTHER PUBLICATIONS

CDMA/HDR: A Bandwidth-Efficient High-Speed Wireless Data Service for Nomadic Users. IEEE. Jul. 2000. pp. 70-77.*
Jalali, A. et al.; "Data Throughput of CDMA-HDR a High Efficiency-High Data Rate Personal Communication Wireless System".

* cited by examiner

Primary Examiner—Ricky Ngo
Assistant Examiner—Derrick W. Ferris
(74) Attorney, Agent, or Firm—Westerman, Hattori, Daniels & Adrian, LLP (57) ABSTRACT

A wireless packet communication system and a base station using an algorithm modified from an existing Proportional Fairness algorithm enables a control according to flexible adjustment of a throughput difference between mobile units and a priority between mobile units.

A function for controlling a difference in throughput and a function for controlling a difference in throughput by the class by classifying a mobile unit are added to the conventional Proportional Fairness algorithm, thereby enabling flexible operation which is suitable for actual operation.

13 Claims, 4 Drawing Sheets

WIRELESS PACKET COMMUNICATION SYSTEM AND BASE STATION

BACKGROUND OF THE INVENTION

1. Field of the Invention

The present invention relates to a wireless packet communication system and a base station. More particularly, the present invention relates to a packet wireless communication system and a base station having an adjusting function which adjusts flexibly the throughput difference between mobile units; and a control function which performs the control according to the priority between mobile units.

2. Description of Related Art

In a wireless packet communication system called High Data Rate (hereinafter, referred to as HDR) system, a scheduler is defined for determining a down link transmission timing. A base station in a conventional HDR system, periodically computes a value of an evaluation function $F_i(n)$ for each mobile unit "i" under the base station, and downlink transmission is carried out for a mobile unit showing maximum value of $F_i(n)$ (a transmission timing is assigned). When downlink transmission is carried out, the value of the evaluation function $F_i(n)$ temporarily decreases, and increases again. That is, the value of the evaluation function $F_i(n)$ reciprocates alternately between a maximum value and a minimum value. When the value is around maximum, downlink transmission is carried out. In Proportional Fairness algorithm proposed by "Processing of IEEE VTC-2000 Spring, "Data Throughput of CDMA-HDR a High Efficiency-High Data Rate Personal Communication Wireless System", A. Jalali, R. Padovani, R. Pankaj", the evaluation function $F_i(n)$ at a time "n" of a mobile unit "i" is expressed by the following formula (2).

$$F_i(n) = \frac{DRC_i(n)}{R_i(n)} \quad (2)$$

$$R_i(n) = \left(1 - \frac{1}{t_c}\right) \times R_i(n-1) + \frac{1}{t_c} \times r_i(n-1) \quad (7)$$

wherein $DRC_i(n)$ represents a required rate in a slot "n" of a mobile unit "i";

$r_i(n)$ represents a transmission rate in a slot "n" relevant to a mobile unit "i";

$R_i(n)$ represents an average transmission rate in a slot "n" relevant to a mobile unit "i" or an indicator in analogous to the average transmission rate;

$t_c$ represents a time constant.

Formula (7) is a formula for obtaining an exponential weighting average immediately close to the transmission rate assigned to the mobile unit "i".

According to a conventional Proportional Fairness algorithm, control performs such that throughput for each mobile unit is simply proportional to the required rate from the mobile unit. Therefore, according to the conventional Proportional Fairness algorithm, a difference in required rate between mobile units appears as a throughput difference as it is, disabling flexible adjustment of a throughput difference between mobile units. In addition, control according to the priority between mobile units is impossible as well.

However, in order to apply the Proportional Fairness algorithm to operation of a communication system in actuality, the following features are required:

a function for adjusting a throughput difference between mobile units; and a function for controlling a throughput difference for each class by classifying the mobile units.

The present invention provides a wireless packet communication system and a base station having capability to enable actual flexible operation by adding these function to the Proportional Fairness algorithm.

SUMMARY OF THE INVENTION

According one aspect of the present invention, there is provided a wireless packet communication system comprising a base station and a plurality of mobile units "i" (i=1 to N), wherein a mobile unit "i" notifies information indicating a transmission rate $DRC_i(n)$ receivable with downlink, information of the transmission rate $DRC_i(n)$ itself or information from which the transmission rate $DRC_i(n)$ can be derived to a base station in every slots, and the base station computes $R_i(n)$ relevant to all the mobile units "i" in every slots capable of transmission in accordance with the following formula (1) and a formula equivalent to the formula (1).

$$R_i(n) = \left(1 - \frac{1}{t_c}\right) \times R_i(n-1) + \frac{1}{t_c} \times f(r_i(n-1)) \quad (1)$$

Wherein $r_i(n)$ represents a transmission rate in a slot "n" relevant to a mobile unit "i"; $t_c$ represents a time constant; and f ( ) denotes an arbitrary function, provided if f (x)≠C·X.

Further, the base station computes an evaluation function $F_i(n)$ in a slot "n" relevant to all the mobile units "i" in accordance with the foregoing formula (2); determines a mobile unit "m" showing maximum value of the evaluation function $F_i(n)$; and transmits a packet to the mobile unit "m" with a downlink at a transmission rate $DRC_m(n)$ at which the mobile unit "m" is receivable.

The foregoing formula (1) is not a formula for obtaining a transmission rate assigned to a mobile unit "i", but is a formula for obtaining a latest exponential weighting average of any index having correlation with the transmission rate.

According to another aspect of the present invention, when it is assumed that the transmission rate $DRC_i(n)$ at which the mobile unit "i" is receivable is an always constant value "x", when a target value of a relative throughput of the mobile unit is S (x), it is preferable that the function f ( ) is the following formula (3) or is a formula equivalent to the formula (3):

$$f(x) = \frac{C \cdot x^2}{S(x)} \text{ (C is an arbitrary constant.)} \quad (3)$$

The foregoing formula (3) is a function in which, when a transmission rate "x" is assigned, a value proportional to a value obtained by dividing a square of the assigned transmission rate by a relative throughput target value defined relevant to the transmission rate is obtained as an index having correlation with the transmission rate.

According to another embodiment of the present invention, it is preferable that a function f ( ) in the foregoing formula (1) is the following formula (4) or is a formula equivalent to the formula (4):

$$f(x) = \frac{\sum_{k=1}^{N_2} h_k(x)}{\sum_{j=1}^{N_1} g_j(x)} \quad (g_j(x) \text{ and } h_j(x) \text{ are arbitrary functions.}) \quad (4)$$

The foregoing formula (4) is a function in which, when a transmission rate "x" is assigned, a value obtained by dividing a summation of several values each having an arbitrary relationship relevant to the assigned transmission rate by a summation of several values each having another arbitrary relationship is obtained as an index having correlation with the transmission rate.

According to another embodiment of the present invention, it is preferable that the formula f ( ) in the foregoing formula (1) is the following formula (5) and is a formula equivalent to the formula (5):

$$f(x) = \frac{\sum_{k=1}^{N_2} c_k \cdot x^{d_k}}{\sum_{j=1}^{N_1} a_j \cdot x^{b_j}} \quad (a_j, b_j, c_k \text{ and } d_k \text{ are arbitrary constants.}) \quad (5)$$

The foregoing formula (5) is a function in which, when a transmission rate "x" is assigned, a value obtained by dividing a summation of some of the values obtained by raising the assigned transmission rate to the n-th power and multiplying a constant (a power and a constant are arbitrary values) by a summation of some of the values obtained by raising the transmission rate and multiplying the constant (a power and a constant are other arbitrary values) is obtained as an index having correlation with the transmission rate.

According to another embodiment of the present invention, it is preferable that the constant in the foregoing function (5) is $N_1=2$, $b_1=0$, $b_2=1$, $N_2=1$, $d_1=2$.

The foregoing function (5) having these constants is a formula for setting a relative throughput target value to a value proportional to a value obtained by summing a value proportional to the assigned transmission rate "x" and a constant value.

According to another embodiment of the present invention, the constants in the foregoing function (5) is $N_1=1$, $b_1=0$, $N_2=1$, $d_1 \neq 1$.

The foregoing function (5) having these constants is a formula for setting a relative throughput target value to a value proportional to a value obtained by raising the transmission rate "x" to the n-th power.

According to another embodiment of the present invention, it is preferable that the constants in the foregoing function (5) is $N_1=2$, $b_1=0$, $b_2=1$, $N_2=1$, $d_1=1$.

The foregoing function (5) having these constants is a formula for setting a relative throughput target value to a value proportional a value obtained by further multiplying a transmission rate by a value obtained by summing a value proportional to the assigned transmission rate "x" and a constant value.

According to another embodiment of the present invention, it is preferable that a plurality of mobile units are classified by a plurality of classes [1] to [M] in advance, and the function f ( ) in the foregoing formula (1) is $f_k$ (x) relevant to the mobile units of class [k] (k=1 to M).

According to another embodiment of the present invention, the foregoing function $f_k$ (x) (k=1 to M) is $f_k$ (x) that has a relationship with the following formula (6).

$$\left.\begin{array}{l} f_2(x) = \frac{1}{A_2} \cdot f_1(x) \\ f_3(x) = \frac{1}{A_3} \cdot f_1(x) \\ \vdots \\ f_M(x) = \frac{1}{A_M} \cdot f_1(x) \end{array}\right\} \quad (6)$$

The foregoing formula (6) is a formula in which an indicator having correlation with a transmission rate of a mobile unit that belongs to class [1] is a constant time of an indicator having correlation with a transmission rate of a mobile unit that belongs to class [2].

According to another aspect of the present invention, it is preferable that a formula f ( ) of the foregoing formula (1) relevant to a mobile unit is a function according to a position of the mobile unit; a distance between the mobile unit and the base station; an orientation of the mobile unit viewed from the base station, and a movement speed or an arbitrary combination of these factors.

According to another aspect of the present invention, it is preferable that the function f ( ) in the foregoing formula (1) is a function according to a communication load, a date and time, a meteorological condition, traffic state or an arbitrary combination of these factors.

According to another aspect of the present invention, in the case where a plurality of base stations exist, the function f ( ) in the foregoing formula (1) is a function selected for each base station, carrier, or combination of these factors, and each of the base stations computes the foregoing formula (1).

According to another aspect of the present invention, there is provided a base station in the previously described wireless packet communication system, wherein it is preferable that the base station computes the foregoing $R_i$ (n) and $F_i$ (n), determines a mobile unit "m" showing maximum value of $F_i$ (n), and transmits a packet to the mobile unit "m" with downlink at a transmission rate $DRC_m$ (n) at which the mobile unit is receivable.

DETAILED DESCRIPTION OF THE PREFERRED EMBODIMENT

Figure 1:
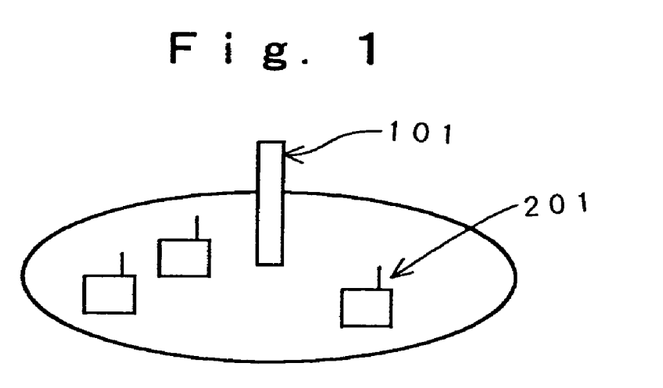
FIG. 1 is a view showing an exemplary configuration of a system according to the present invention.

FIG. 1 is a view showing an exemplary configuration of a system according to the present invention. In the figure, reference numeral 101 denotes a base station, and reference numeral 201 denotes a mobile unit.

Figure 2:
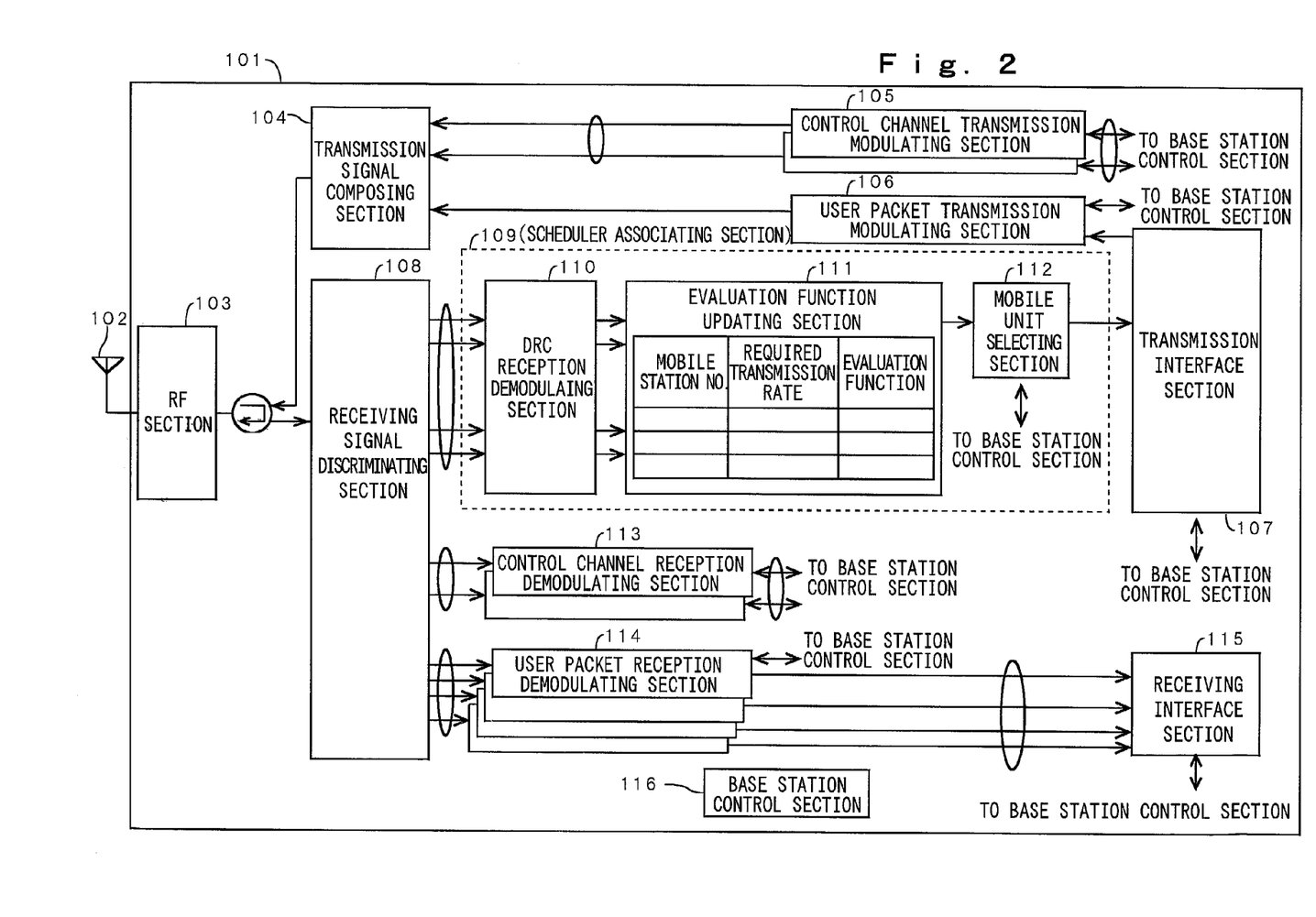
FIG. 2 is a block diagram depicting a specific example of an internal configuration of a base station according to the present invention.

FIG. 2 shows an example of an internal configuration of the base station 101. The base station 101 is composed of: antenna 102, an RF section 103; a transmission signal composing section 104; a control channel transmission modulating section 105; a user packet transmission modulating section 106; a transmission interface section 107; a receiving signal discriminating section 108; a scheduler associating section 109; a DRC reception demodulating section 110; an evaluation function updating section 111; a mobile unit selecting section 112; a control channel reception demodulating section 113; a user packet reception demodulating section 114; and a receiving interface section 115. The DRC reception demodulating section 110 of the base station 101 receives a transmission rate DRC receivable from a plurality of mobile units via the antenna 102, RF section 103, and receiving signal discriminating section 108. The received transmission rate DRC is delivered to the evaluation function updating section 111, and is used for computing a value of an evaluation function $F_i(n)$ for each mobile unit. The updated evaluation function is delivered to the mobile unit selecting section 112. The mobile unit selecting section 112 compares the evaluation function values with each other between mobile units, and selects a mobile unit whose evaluation function value is maximum. The selection result is conveyed to the transmission interface section 107. The transmission interface section 107 searches for transmission data of the selected mobile unit, and transmits the searched data to the user packet transmission modulating section 106. The transmission data delivered to the user packet transmission modulating section 106 is transmitted to the mobile unit via the transmission signal composing section 104, RF section 103, and antenna 102. The base station control section 116 manages information required for control of the modulating section and demodulating section and link operation between these sections, and transfers the information between functional sections. The computational formulas such as $R_i(n)$, $F_i(n)$, $f(x)$, and $F_i(x)$ claimed in the present invention are used for computing the evaluation function value for each mobile unit at the evaluation function updating section 111.

Figure 3:
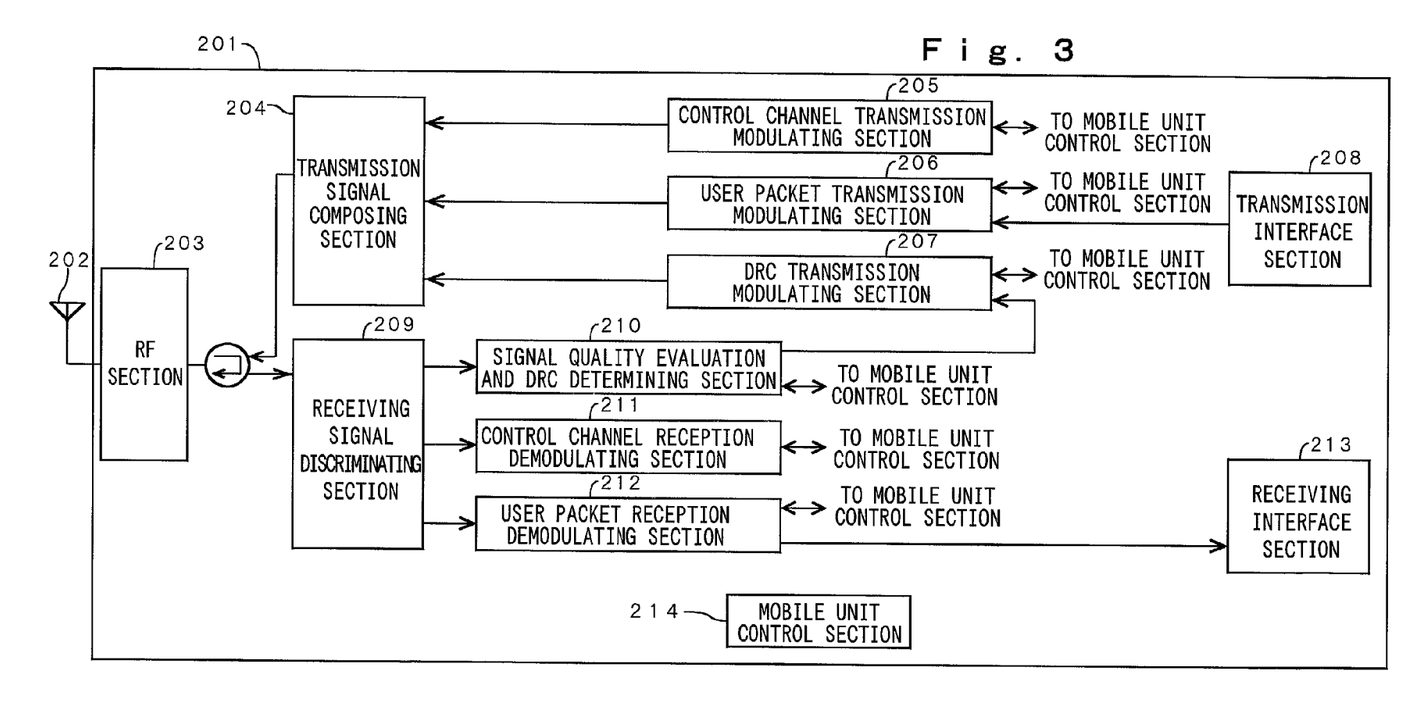
FIG. 3 is a block diagram depicting a specific example of an internal configuration of a mobile unit according to the present invention.

FIG. 3 shows an example of an internal configuration of the mobile unit 201. The mobile unit 201 is composed of: an antenna 202; an RF section 203; a transmission signal composing section 204; a control channel transmission modulating section 205; a user packet transmission modulating section 206; a DRC transmission modulating section 207; a transmission interface section 208; a receiving signal discriminating section 209; a signal quality evaluation and DRC determining section 210; a control channel reception demodulating section 211; a user packet reception demodulating section 212; and a receiving interface section 213. The signal quality evaluation and DRC determining section 210 carry out quality evaluation of a receiving signal delivered via the antenna 202, RF section 203, and receiving signal discriminating section 209. and determines a transmission rate DRC receivable by a downlink. The transmission rate DRC is delivered to the section 207, and is transmitted to a base station via the transmission signal composing section 204, RF section 203, and antenna 202. The mobile unit control section 214 manages information required for control the modulating section and the demodulating section and a link operation between these sections, and transfers the information between functional sections.

Hereinafter, embodiments of the present invention will be specifically described.

[First Embodiment]

Formula (1) is obtained by generalizing formula (7) of $R_i(n)$ in the evaluation function $F_i(n)$ of the Proportional Fairness algorithm. That is, $r_i(n-1)$ in the computational formula of $R_i(n)$ is generalized by the function $f(r_i(n-1))$ of $r_i(n-1)$. Flexible operation of a wireless packet communication system is achieved by variously defining function $f()$ in formula (1).

$$R_i(n) = \left(1 - \frac{1}{t_c}\right) \times R_i(n-1) + \frac{1}{t_c} \times f(r_i(n-1)) \quad (1)$$

The foregoing formula (1) is a formula for obtaining an average of values when a transmission rate relevant to a mobile unit "i" is converted by function $f()$.

Figure 4:
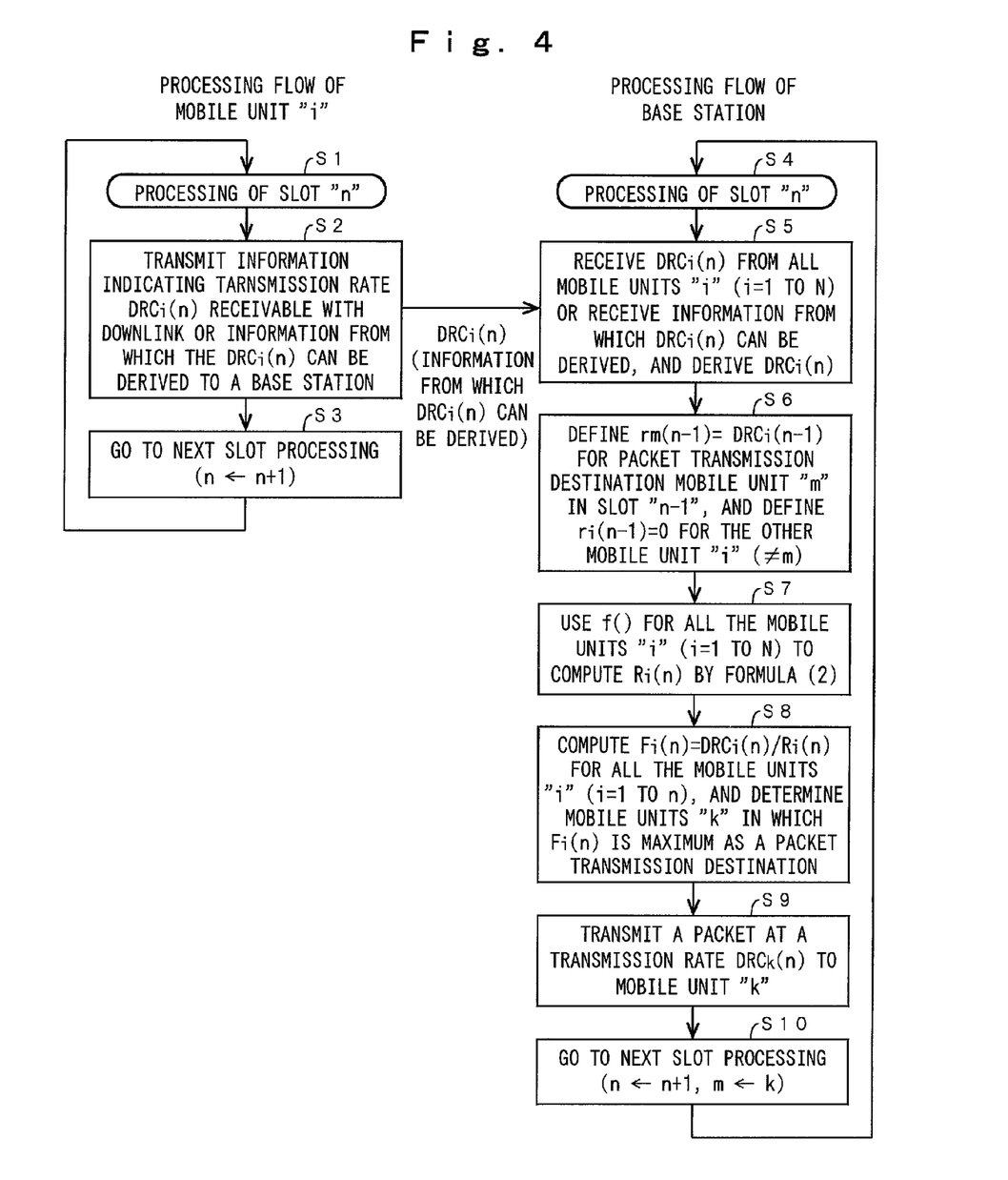
FIG. 4 is a flow chart showing an example of the flow of processing according to the present invention.

Processing using the foregoing formula (1) will be described here. An example of the flow of processing is shown in FIG. 4. A mobile unit notifies to a base station (or network) a DRC value (or information corresponding to the DRC value) periodically (in every slots in accordance with steps S1 to S3 in an example shown in FIG. 4). The base station (or network) receives (step S5) the DRC value (or information corresponding to the DRC value), and computes (step S7) the value of $R_i(n)$ relevant to all the mobile units "i" (i=1 to N). Then, the value of the evaluation function $F_i(n)$ relevant to all the mobile units is obtained by the following formula (2) by using these values. In addition, the values of the evaluation function $F_i(n)$ are compared with each other, and a mobile unit "k" in which the value of the evaluation function $F_i(n)$ is maximum is determined as a packet transmission destination.

$$F_i(n) = \frac{DRC_i(n)}{R_i(n)} \quad (2)$$

Then, the base station (or network) transmits a packet at a transmission $DRC_k(n)$ relevant to the mobile unit "k" (step S9). The base station (or network) repeatedly carries out this procedure periodically (in every slots in accordance with the steps S4 to S10 in an example shown in FIG. 4), thereby transmitting a packet to each mobile unit. The computation/comparison processing of the evaluation function $F_i(n)$ can be carried out by transferring data to another device other than a base station in a network.

A formula used for computation of $R_i(n)$ in this processing may be a formula equivalent to the formula (1) without being limited to the formula (1) itself. For example, the following formula is equivalent to formula (1).

$$R_i(n) = \alpha \times R_i(n-1) + (1-\alpha) \times f(r_i(n-1)):$$

$\alpha$ corresponding to $1 - \frac{1}{t_c}$ $$R_i(n) = \left(1 - \frac{1}{t_c}\right) \times R_i(n-1) + \frac{1}{t_c} \times f_0(r_i(n-1)) + \beta:$$

$f_0(r_i(n-1))$ corresponding to $f(r_i(n-1)) - t_c \beta$ $$R_i(n) = \alpha \times R_i(n-1) + f_0(r_i(n-1)):$$

$\alpha$ corresponding to $1 - \frac{1}{t_c}$, $f_0(r_i(n-1))$ corresponding to $\frac{1}{t_c}(r_i(n-1))$ Here, assuming that the states of all the mobile units do not change during a predetermined period of time, and considering that $F_i$ (n) expressed by the foregoing formula (2) is a constant value C in all the mobile units depending on the mobile units on average, the following formula (8) is established:

$$\frac{DRC_i(n)}{R_i(n)} = C \quad (8)$$

Assuming that the value of $DRC_i$ (n) for each mobile unit is constant in view of time (independent of "n"), and assuming that an average proportion of slot assignment times for each mobile unit is $T_i$, a relationship of $r_i$ (n−1) =$DRC_i$ or 0 is met. Thus, $R_i$ being an average of f ($r_i$ (n−1)) is approximately expressed by the following formula (9).

$$R_i = f(DRC_i) \cdot T_i + f(0) \cdot (1-T_i) = f(DRC_i) \cdot T_i$$

(here, let us assume $f(0)=0$) \quad (9)

From the foregoing formulas (8) and (9), $T_i$ can be expressed by the following formula (10):

$$T_i = \frac{DRC_i}{C \cdot f(DRC_i)} \quad (10)$$

Hence, a relative indicator $S_i$ of throughput for each mobile unit (referred to as relative throughput) is expressed by the following formula (11).

$$S_i = DRC_i \cdot T_i = \frac{DRC_i^2}{C \cdot f(DRC_i)} \quad (11)$$

Conversely, when it is assumed that a transmission rate $DRC_i$ (n) at which the mobile unit "i" is receivable is an always constant value "x", when a target value of the relative throughput of the mobile unit is set to a function S (x), the function S (x) is expressed by the following formula (12) based on the foregoing formula (11).

$$S(x) = \frac{x^2}{C \cdot f(x)} \quad (12)$$

The following formula (3) is derived from the foregoing formula (12).

$$f(x) = \frac{C \cdot x^2}{S(x)} \quad (3)$$

Function f (x) shown in the foregoing formula (3) can be used as a function f ( ) of computational formula (1) of a denominator $R_i$ (n) of the evaluation function $F_i$ (n) expressed by formula (2), thereby enabling a control that achieves an arbitrary function S (x) set as a target value of the relative throughput of the mobile unit.

For example, in the case where throughput proportional to "x" is set as a target, a relationship S (x)=x is met, and f (x)=C·x (where C is a constant) is derived from the foregoing formula (3). This example shows a conventional Proportional Fairness algorithm, where throughput for each mobile unit is simply proportional to a required rate from such each mobile unit. However, the use of f (x)=C·x is included in the prior art, and is out of the scope of the present invention. In the present invention, f (x) other than f (x)=C·x is used.

A simple example of f (x) used in the present invention is shown below. In the case where the target throughput is made constant irrespective of "x", a relationship of S (x)=1 may be met, and thus, f (x)=C·$x^2$ is derived in accordance with the foregoing formula (3). Table 1 shows a correlation between S (x) and f (x) in some simple cases.

TABLE 1

| Example of S(x) and f(x) | |
|---|---|
| S(x) | f(x) |
| 1 | C · $x^2$ |
| $\sqrt{x}$ | $\sqrt{x}$ |
| $x^2$ | C |
| x + a | $\sqrt{x}$ |

Although f (x) used in the present invention may be any function other than f (x)=C·x, as described above, it is expressed in the form of a generalized function, as shown in the following example.

For example, if the function S (x) of the target value of relative throughput is expressed by the following formula (13), the following formula (4) is derived by the foregoing formula (3).

$$S(x) = \frac{\sum_{j=1}^{N_1} g_j(x)}{\sum_{k=1}^{N_2} v_k(x)} \quad (g_j(x) \text{ and } v_k(x) \text{ are arbitrary functions.}) \quad (13)$$

$$f(x) = \frac{\sum_{k=1}^{N_2} h_k(x)}{\sum_{j=1}^{N_1} g_j(x)} \quad (h_k(x) = C \cdot x^2 \cdot v_k(x)) \quad (4)$$

In addition, assuming that the function S (x) of the target value of relative throughput is expressed by the following formula (14), the following formula (5) is derived by the foregoing formula (3).

$$S(x) = \frac{\sum_{j=1}^{N_1} a_j \cdot x^{b_j}}{\sum_{k=1}^{N_2} e_k \cdot x^{f_k}} \quad (a_j, b_j, e_k, f_k \text{ are arbitrary constants.}) \quad (14)$$

-continued $$f(x) = \frac{\sum_{k=1}^{N_2} c_k \cdot x^{d_k}}{\sum_{j=1}^{N_1} a_j \cdot x^{b_j}} \quad (c_k = C \cdot e_k, d_k = f_k + 2) \tag{5}$$

As has been described above, according to the present invention, a function f ( ) of computational formula (1) of a denominator $R_i$ (n) of the evaluation function $F_i$ (n) expressed by the foregoing formula (2) is arbitrary set, thereby enabling flexible setting of scheduling (ordering) of downlink packet transmission based on a required rate from a mobile unit. In particular, the function f ( ) is set based on the foregoing formula (3), whereby scheduling is achieved such that relative throughput is obtained as a target value.

[Second Embodiment]

Further, some specific examples are shown below. As an example when a ratio between the maximum and minimum values of the relative throughput target value S (x) is within a constant value, consider that the relative throughput target value S (x) is set as shown in the following formula (15).

$$S(x) = S_0 \cdot \left(1 + K \cdot \frac{x}{DRC_{max}}\right) \tag{15}$$

$(K > -1, DRC_{max} = $ maximum value that $DRC$ can take$)$

Hence, when $K \geq 0$, the throughput increases as "x" increases, and the ratio between the maximum and minimum values is within the range of K+1. When −1<K<0, the throughput increases as "x" decreases, and the ratio between the maximum and minimum values is within the range of 1/(K+1). The following formulas (16) is derived from the foregoing formulas (15) and (3).

$$f(x) = \frac{x^2}{S_0 C \cdot \left(1 + K \cdot \frac{x}{DRC_{max}}\right)} = \frac{x^2}{1 + K \cdot \frac{x}{DRC_{max}}} \tag{16}$$

(since $S_0 C$ can be set as an arbitrary value, let us assume $S_0 C = 1$)

The foregoing formula (16) is equivalent to settings of $N_1=2$, $b_1=0$, $b_2=1$, $N_2=1$, $D_1=2$ in the foregoing formula (5).

Function f (x) expressed by the foregoing formula (16) is used as a function f (x) of the computational formula (1) of the denominator $R_i$ (n) of the evaluation function $F_i$ (n) expressed by the foregoing formula (2), whereby a ratio between the maximum and minimum values of throughput $S_i$ is controlled within the range of K+1 or 1/(K+1) (where K is an arbitrary numeric value greater than −1).

As another example of flexibly setting a difference in throughput between mobile units, the target value S (x) of relative throughput may be set as shown in the following formula (17):

$$S(x) = S_0 \cdot x^{1+\alpha} (\alpha \neq 0) \tag{17}$$

Where α<0, when "x" is smaller, higher throughput is obtained as compared with that in the conventional Proportional Fairness algorithm. That is, a control is made in a direction in which a difference in throughput between mobile units is reduced. Conversely, if α>0, when "x" is greater, the throughput is higher. That is, a control is made in a direction in which a difference in throughput between mobile units is expanded.

The following formula (18) is derived from the foregoing formulas (17) and (3).

$$f(x) = \frac{x^{1-\alpha}}{S_0 C} = x^{1-\alpha} \tag{18}$$

$(\alpha \neq 0)$ ( since $S_0 C$ may be set as an arbitrary value, and thus, let us assume $S_0 C = 1$)

The foregoing formula (18) is equivalent to settings of $N_1=1$, $b_1=0$, $N_2=1$, $d_1 \neq 1$.

In the case where f (x) expressed by the foregoing formula (18) isused as a function f ( ) of the computational formula (1) of the denominator $R_i$ (n) of the evaluation function $F_i$ (n) expressed by the foregoing formula (2), (1) If α>0 is set, a downlink transmission timing is controlled so that the throughput of a mobile unit "i" is high when the maximum transmission rate notified from the mobile unit to the base station is high; and (2) If α<0 is set, a downlink transmission timing is controlled so that the throughput of a mobile unit "i" is high when the maximum transmission rate notified from the mobile unit to the base station is low.

In this manner, a difference in throughput between mobile units is expanded (1) or reduced (2).

As a still another example, S (x) is considered to be set so that a ratio between the minimum and maximum values of proportion $T_i$ in slot assignment time is restricted within a constant value. In this case, the proportion $T_i$ of a slot assignment time corresponding to a transmission rate "x" at which a mobile unit is receivable may be set as a function T (x) as shown in the following formula (19).

$$T(x) = T_0 \cdot \left(1 + L \cdot \frac{x}{DRC_{max}}\right) \tag{19}$$

$(L > -1, DRC_{max} = $ maximum value that $DRC$ can take$)$

Hence, in the case where $L \geq 0$, when "x" is greater, the proportion of a slot assignment time is higher, and the ratio between the maximum and minimum values is within the range of L+1. In the case where −1<L<0, the proportion of a slot assignment time is higher when "x" is the greater, and the ratio between the maximum and minimum value is within the range of 1/(L+1).

When the function T (x) is expressed by the foregoing formula (19), the relative throughput target value S (x) is derived in the same way as when the foregoing formula (11) is derived from the foregoing formula (10), and is expressed by the following formula (20).

$$S(x) = T_0 \cdot \left(1 + L \cdot \frac{x}{DRC_{max}}\right) \cdot x \tag{20}$$

$(L > -1, RC_{max} = $ maximum value that DRC can take$)$

As in the foregoing formula (20), if the relative throughput target value S (x) is set, the ratio between the minimum and maximum values of the proportion $T_i$ of the slot assignment time is restricted within a constant value in accordance with the foregoing formula (19).

The following formula (21) is derived from the foregoing formulas (20) and (3):

$$f(x) = \frac{x}{T_0 C \cdot \left(1 + L \cdot \frac{x}{DRC_{max}}\right)} = \frac{x}{1 + L \cdot \frac{x}{DRC_{max}}} \quad (21)$$

(since $T_0 C$ may be set as an arbitrary value, let us assume $$T_0 C = 1)$$

The foregoing formula (21) is equivalent to settings of $N_1=2$, $b_1=0$, $b_2=1$, $N_2=1$, $d_1=1$ in the foregoing formula (5).

Function f (x) expressed by the foregoing formula (21) is used as a function f ( ) of the computational formula (1) of the denominator $R_i$ (n) of the evaluation formula $F_i$ (n) expressed by the foregoing formula (2), whereby the ratio between the minimum and maximum values of average $T_i$ of the slot assignment time is controlled within L+1 or 1/(L+1) (where L is an arbitrary numeric value that is greater than −1).

In the foregoing, although there are shown some examples of f (x), the basic characteristics of the present invention is that a function other than f (x)=C·x is used as f (x), and the present invention includes use of f (x) that is not shown here.

[Third Embodiment]

The mobile units are classified into a plurality of classes, and individual function is used as f ( ) of the computational formula (1) of $R_i$ (n) relevant to mobile units for the respective classes each, thereby enabling a control such that a throughput difference is provided for each class.

For example, in the case where the mobile units are classified into two classes [1] and [2], and a control is provided such that the throughput of the mobile units in class [2] is A times of that of the mobile units in class [1], throughput $S_1$ of the mobile units in class [1] and throughput $S_2$ of the mobile units in class [2] are expressed in the following formula (22) based on he foregoing formula (12).

$$S_1(x) = \frac{x^2}{C \cdot f_1(x)} \quad (22)$$

$$S_2(x) = \frac{x^2}{C \cdot f_2(x)}$$

When $A \cdot S_1 = S_2$, a relationship between $f_1$ (x) and $f_2$ (x) is expressed by the following formula (23).

$$f_2(x) = \frac{1}{A} \cdot f_1(x) \quad (23)$$

(for example, when use of the Proportional Fairness algorithm is presumed, we can set $f_1(x) = x$, $f_2(x) = 1/A \cdot x$).

As function f ( ) of the computational formula (1) of the denominator R1 (n) of the evaluation function $F_i$ (n) expressed by the foregoing formula (2), $f_1$ (x) and $f_2$ (x) having a relationship expressed by the foregoing formula (23) can be used for each of the mobile units in classes [1] and [2], thereby enabling a control to provide a throughput difference for each class.

Further, in the case where the number of classes is M which are classes [1] to [M], $f_1$ (x), $f_2$ (x), . . . , $f_M$ (x) having a relationship expressed by the following formula (24) can be used as function f ( ) that corresponds to the mobile units of the respective classes.

$$\left.\begin{array}{l} f_2(x) = \dfrac{1}{A_2} \cdot f_1(x) \\ f_3(x) = \dfrac{1}{A_3} \cdot f_1(x) \\ \vdots \\ f_M(x) = \dfrac{1}{A_M} \cdot f_1(x) \end{array}\right\} \quad (24)$$

Hence, the throughput of the mobile units in class [i] (i=2 to M) is $A_i$ times of that of the mobile units in class [1].

As has been described above, individual function for respective classes is used as f ( ) of the computational formula (1) of $R_i$ (n), thereby enabling a control to flexibly set a throughput difference for each class such as setting the throughput of mobile units in special class to be twice of those in general class.

[Fourth Embodiment]

Function f ( ) of the computational formula (1) of $R_i$ (n) can be differentiated according to a position of a mobile unit (including distance between a mobile unit and a base station and orientation of a mobile unit viewed from a base station) or movement speed.

For example, a relation table as shown in Table 2 is prepared according to a distance between a mobile unit and a base station, a position of the mobile unit is detected by any means, a distance between the mobile unit and the base station is computed, a function corresponding to the distance is obtained from the table, and the obtained function can be used as a function f ( ).

TABLE 2

Example of relation between a distance between a mobile unit
and a base station and a function f( )

| Distance | 0~100 m | 100~200 m | 200~400 m | 400~800 m | 800 m or more |
|---|---|---|---|---|---|
| Function f(x) | x | $\sqrt{x}$ | $\sqrt{x}$ | $\sqrt{x}$ | $\sqrt{x}$ |

In addition, function f ( ) may include a position of a mobile unit (or a distance between a mobile unit and a base station, an orientation of a mobile unit viewed from a base station and the like) as a variable. For example, as in the following formula (25), variables (p, q in the following example) indicating a position of a mobile unit (or a distance between a mobile unit and a base station or orientation viewed from a base station and the like) may be included in a formula that represents function f ( ).

$$f(x, p, q) = \frac{x^2}{x + \sqrt{p^2 + q^2}} \quad (25)$$

In this case, a position of the detected mobile unit (or a distance between a mobile unit and a base station or orientation of a mobile unit viewed from a base station and the like) is substituted for the foregoing function (25), and the result may be used as function f ( ) of the computational formula (1) of $R_i$ (n).

In the above exemplified function (25), assuming that the position of a mobile unit is p=300, q=400 (meters) (when a base station position is defined as an origin), the following formula (26) may be used in the computational formula (1) of $R_1$ (n).

$$f(x) = \frac{x^2}{x + \sqrt{300^2 + 400^2}} = \frac{x^2}{x + 500} \quad (26)$$

Function f ( ) according to a movement speed of a mobile unit and function f ( ) according to both of the mobile unit position and movement speed can be used as function f ( ) of the computational formula (1) of $R_1$ (n) similarly.

As described above, function f ( ) according to a position of a mobile unit (or a distance between a mobile unit and a base station or orientation of a mobile unit viewed from a base station and the like) or a movement speed can be used, whereby enabling flexible setting of a downlink packet transmission scheduling according to a position of a mobile unit (or a distance between a mobile unit and a base station or orientation of a mobile unit viewed from a base station) or a movement speed such that throughput of a mobile unit distant from a base station is prevented from being lowered, for example, or a priority is given to transmission to a mobile unit with its low movement speed.

[Fifth Embodiment]

Function f ( ) of the computational formula (1) of $R_i$ (n) can be changed according to a communication load.

For example, a relation table as shown in Table 3 is prepared according to the number of simultaneously connected mobile units, considering the number of mobile units connected simultaneously to a base station as a scale of communication load. Then, the number of simultaneously connected mobile units is obtained, a function corresponding to the number of simultaneously connected mobile units is obtained from the table, and the obtained function can be used as function f ( ).

TABLE 3

Example of relation between the number of
simultaneously connected mobile units and function f( )

| Number of simultaneously connected mobile units | 1 to 5 | 6 to 10 | 11 to 20 | 21 to 30 | 31 or more |
|---|---|---|---|---|---|
| Function f(x) | x | $x^{1.25}$ | $x^{1.5}$ | $x^{1.75}$ | $x^2$ |

In addition, function f (x) may include the number of simultaneously connected mobile units as a variable. For example, as in the following formula (27), a variable indicating the number of simultaneously connected mobile units ("r" in the following example) may be included in the formula representing a function.

$$f(x, r) = \frac{x^2}{x + r} \quad (27)$$

In this case, the detected number of simultaneously connected mobile units is substituted for the foregoing function (27), and the result may be used as function f ( ) of the computational formula (1) of $R_i$ (n).

In the above exemplified function (27), assuming that r=23, the following formula (28) may be used by the computational formula (1) of $R_1$ (n).

$$f(x) = \frac{x^2}{x + 23} \quad (28)$$

In the case where a control according to a communication load is provided by using a use rate of a traffic channel or another indicator, function f ( ) of the computational formula (1) of $R_i$ (n) may be associated with an indicator indicating a communication load such as a traffic channel use rate.

In addition, when a change caused by date and time of communication load (by time intervals, day of the week, holiday, national holiday, weekday or season), a change caused by a meteorological conditions (such as weather, temperature, or humidity), or a change caused by a traffic state (such as degree of traffic congestion or accidents) is known in advance or can be estimated, function f ( ) of the computational formula (1) of $R_i$ (n) can be changed according to date or time, meteorological conditions, or traffic state. In this case as well, a relation table between date or time, meteorological conditions, or traffic state is prepared, and function f ( ) is obtained according to the relation table. Alternatively, date or time, meteorological conditions, or traffic state are included as variables in function f ( ), the date or time, meteorological conditions, or traffic state is substituted for a function, and the result may be obtained as function f ( ) of the computational formula (2) of $R_1$ (n).

As has been described above, function f ( ) according to a communication load, date or time, meteorological conditions, or traffic state can be used, thereby enabling flexible settings of downlink packet transmission scheduling according to the communication load, date or time, meteorological conditions, or traffic state such that, when a communication load is high, priority is given to transmission to a mobile unit with its low required rate.

[Sixth Embodiment]

In the case where a plurality of base stations exist, and a respective one of the base stations carries out processing shown in FIG. 2, function f ( ) of the computational formula (1) of $R_i$ (n) can be selected independently for each base station.

For example, when three base stations (base stations 1 to 3) are present, the functions expressed by the following formula (29) can be used as function f ( ) of the computational formula (1) of $T_i$ (n) in processing of such each base station.

$$\begin{aligned} \text{base station } 1 &: f(x) = \frac{x^2}{x+1000} \\ \text{base station } 2 &: f(x) = x \\ \text{base station } 3 &: f(x) = x^{1.5} \end{aligned} \quad (29)$$

Function f ( ) may be changed according to the position/ movement speed or communication load of the mobile unit, as shown in the fourth and fifth embodiments independently in such each base station. For example, when three base stations (base stations 1 to 3) are present, the functions expressed by the following formulas (30) to (32) can be used as function f ( ) of the computational formula (1) of $R_i$ (n) in processing of such each base station.

Base station 1: Changed according to position (coordinate p, q) of a mobile unit $$f(x, p, q) = \frac{x^2}{x + \sqrt{p^2 + q^2}} \quad (30)$$

Base station 2: Changed according to a communication load (the number of simultaneously connected mobile units "r")

$$f(x, r) = \frac{x^2}{x + r} \quad (31)$$

Base station 3: No change $$f(x) = x^{1.5} \quad (32)$$

Similarly, in the case where a plurality of carriers are used for packet communication, function f ( ) can be selected independently for each base station, or alternatively, by a combination of the base station and carrier.

As described above, function f ( ) can be selected independently for each base station, or alternatively, by a combination of the base station and carrier, thereby enabling flexible setting of suitable downlink packet transmission scheduling for each base station or carrier by a combination of these base station and carrier such that, for example, a base station in which a communication load is temporarily high carries out a control according to a communication load, and a base station communicating with a mobile unit with its great deviation at a movement speed carries out a control according to the movement speed.

In a variety of embodiments of a wireless packet communication system according to the present invention described previously, various modification, alteration, and omission can be easily made by one skilled in the art within departing from the technical idea and scope of the present invention. The previous description is provided as a mere example, and does not mean any restriction on the present invention. The present invention is restricted only when the invention is limited as scales and its equivalents.

As has been described above in detail, according to the present invention, function f ( ) of the computation formula (1) of the denominator $R_i$ (n) of the evaluation function $F_i$ (n) expressed by the foregoing formula (2) is arbitrarily set, thereby enabling flexible setting of downlink packet transmission scheduling (ordering) based on a required rate from the mobile unit. In particular, function f ( ) is set based on the foregoing formula (3), whereby scheduling is achieved such that relative throughput is obtained as a target value.

f (x) expressed by the foregoing formula (16) is used as function f ( ), whereby a ratio between the maximum and minimum values of throughput $S_i$ is controlled within K+1 or 1/(K+1) (where K is an arbitrary numeric vale greater than −1.)

By using f (x) expressed by the foregoing formula (18) as function f ( ), when (1)α>0 is set, a downlink transmission timing is controlled so that throughput of a mobile unit "i" is high when the maximum transmission speed notified from the mobile unit to the base station is high.

(2) When α<0 is set, a downlink transmission timing is controlled so that throughput of a mobile unit "i" is high when the maximum transmission speed notified from the mobile unit to the base station is low.

In this manner, a difference in throughput between mobile units is expanded (1) or reduced (2).

Function f (x) expressed by the formula (21) is used as function f ( ), whereby a ratio between the minimum and maximum values of average $T_i$ of slot assignment times is controlled within the range of L+1 or 1/(L+1) (where L is an arbitrary numeral value greater than −1).

Mobile units are classified by a plurality of classes, and other functions are used as f ( ) of the computational formula (1) of $R_i$ (n) relevant to the mobile unit for each class, thereby enabling flexible setting of a throughput difference for each class such that, for example, the throughput of mobile units in special class is set to be twice of that of mobile units in general class.

A function according to a position of a mobile unit (or a distance between a mobile unit and a base station or orientation of a mobile unit viewed from a base station and the like) or a movement speed is used, thereby enabling flexible settings of downlink packet transmission scheduling according to a position of a mobile unit (or a distance between a mobile unit and a base station or orientation of a mobile unit viewed from a base station and the like) or a movement speed such that the throughput of a mobile unit distant from a base station is prevented from being lowered or priority is given to transmission to a mobile unit with a low movement speed.

Function f ( ) according to a communication load, date and time, meteorological conditions, or traffic state is used, thereby enabling flexible settings of downlink packet transmission scheduling according to a communication load, date or time, or meteorological conditions, or traffic state such that priority is given to transmission to a mobile unit in which a required rate is low when a communication load is high.

Function f ( ) is selected arbitrarily for base station or carrier, or alternatively, by a combination of these base station or carrier, thereby enabling flexible settings of downlink packet transmission scheduling suitable to each base station or carrier, or alternatively, by a combination of these base station and carrier such that a base station in which a communication load is temporarily high carries out a control according to the communication load, and a base station communicating with a mobile unit with its significant deviation in movement speed carries out a control according to a movement speed.

What is claimed is:

1. A wireless packet communication system comprising a base station and a plurality of mobile units, wherein
a mobile unit "i" notifies information indicating a transmission rate $DRC_i$ (n) receivable with downlink, information of the transmission rate $DRC_i$ (n) itself or information from which the transmission rate $DRC_i$ (n) can be derived to a base station in every slots,
and the base station computes $R_i$ (n) relevant to all the mobile units "i" in every slots capable of transmission in accordance with the following formula (1) or a formula equivalent to the formula (1),
further, the base station computes an evaluation function $F_i$ (n) in a slot "n" relevant to all the mobile units "i" in accordance with the following formula (2); determines a mobile unit "m" showing maximum value of the evaluation function Fi (n); and
transmits a packet to the mobile unit "m" with a downlink at a transmission rate $DRC_m$ (n) at which the mobile unit "m" is receivable, $$R_i(n) = \left(1 - \frac{1}{t_c}\right) \times R_i(n-1) + \frac{1}{t_c} \times f(r_i(n-1)) \quad (1)$$

wherein $r_i$ (n) represents a transmission rate in a slot "n" relevant to a mobile unit "i"; $t_c$ represents a time constant;
and f ( ) denotes an arbitrary function, provided if f (x)≠C·x.

$$F_i(n) = \frac{DRC_i(n)}{R_i(n)} \quad (2)$$

(C is an arbitrary constant).

2. A wireless packet communication system according to claim 1, wherein, when it is assumed that the transmission rate $DRC_i$ (n) at which the mobile unit "i" is receivable is an always constant value "x", when a target value of a relative throughput of the mobile unit is S (x), the function f ( ) is the following formula (3) or a formula equivalent to the formula (3):

$$f(x) = \frac{C \cdot x^2}{S(x)}. \quad (3)$$

3. A wireless packet communication system according to claim 1, wherein function f ( ) in the foregoing formula (1) is the following formula (4) or a formula equivalent to the formula (4):

$$f(x) = \frac{\sum_{k=1}^{N_2} h_k(x)}{\sum_{j=1}^{N_1} g_j(x)} \quad (4)$$

($g_j(x)$ and $h_j(x)$ are arbitrary functions).

4. A wireless packet communication system according to claim 1, wherein the formula f( ) in the foregoing formula (1) is the following formula (5) and is a formula equivalent to the formula (5):

$$f(x) = \frac{\sum_{k=1}^{N_2} c_k \cdot x^{d_k}}{\sum_{j=1}^{N_1} a_j \cdot x^{b_j}} \quad (5)$$

($a_j$, $b_j$, $c_k$ and $d_k$ are arbitrary constants.).

5. A wireless packet communication system according to claim 4, wherein the constant in the foregoing function (5) is $N_1=2$, $b_1=0$, $b_2=1$, $N_2=1$, $d_1=2$.

6. A wireless packet communication system according to claim 4, wherein the constants in the foregoing function (5) is $N_1=1$, $b_1=0$, $N_2=1$, $d_1 16 1$.

7. A wireless packet communication system according to claim 4, wherein the constants in the foregoing function (5) is $N_1=2$, $b_1=0$, $b_2=1$, $N_2 32 1$, $d=1$.

8. A wireless packet communication system according to claim 1, where in a plurality of mobile units are classified by a plurality of classes [1] to [M] in advance, and the function f () in the foregoing formula (1) is $f_k$ (x) relevant to the mobile units of class [k] (k=1 to M).

9. A wireless packet communication system according to claim 8, wherein the foregoing function $f_k$ (x) (k=1 to M) is $f_k$ (x) that has a relationship with the following formula (6).

$$f_2(x) = \frac{1}{A_2} \cdot f_1(x) \quad (6)$$
$$f_3(x) = \frac{1}{A_3} \cdot f_1(x)$$
$$\vdots$$
$$f_M(x) = \frac{1}{A_M} \cdot f_1(x)$$

(A is an arbitrary constant).

10. A wireless packet communication system according to claim 1, wherein formula f( ) of the foregoing formula (1) relevant to a mobile unit is a function according to a position of the mobile unit; a distance between the mobile unit and the base station; an orientation of the mobile unit viewed from the base station, and a movement speed or an arbitrary combination of these factors.

11. A wireless packet communication system according to claim 1, wherein the function f( ) in the foregoing formula (1) is a function according to a communication load, a date and time, a meteorological condition, traffic state or an arbitrary combination of these factors.

12. A wireless packet communication system according to claim 1, wherein, in the case where a plurality of base stations exist, the function f ( ) in the foregoing formula (1) is a function selected for each base station, carrer, or combination of these factors, and each of the base stations computes the foregoing formula (1).

13. A base station in a wireless packet communication system according to claim 1, wherein the base station computes the foregoing $R_i$ (n) and $F_i$ (n), determines a mobile unit "m" showing maximum value of $F_i$ (n), and transmits a packet to the mobile unit "m" at a transmission rate $DRC_m$ (n) at which the mobile unit is receivable.

* * * * *